(12) United States Patent
Schroetz (10) Patent No.: US 12,391,792 B2
(45) Date of Patent: Aug. 19, 2025

(54) HARDENER FORMULATION FOR COLD CURING EPOXY SYSTEMS (71) Applicant: BLUE CUBE IP LLC, St. Louis, MO (US)

(72) Inventor: Markus Schroetz, Ochsenhausen (DE)

(73) Assignee: BLUE CUBE IP LLC, St. Louis, MO (US)

( * ) Notice: Subject to any disclaimer, the term of this patent is extended or adjusted under 35 U.S.C. 154(b) by 0 days.

(21) Appl. No.: 18/040,566

(22) PCT Filed: Jul. 29, 2021

(86) PCT No.: PCT/US2021/043741
§ 371 (c)(1),
(2) Date: Feb. 3, 2023

(87) PCT Pub. No.: WO2022/031517
PCT Pub. Date: Feb. 10, 2022

(65) Prior Publication Data
US 2023/0220150 A1 Jul. 13, 2023

Related U.S. Application Data (60) Provisional application No. 63/061,422, filed on Aug. 5, 2020.

(51) Int. Cl.
C08L 63/02 (2006.01)
C08G 59/18 (2006.01)
C08G 59/24 (2006.01)
C08G 59/32 (2006.01)
C08G 59/50 (2006.01)
C08G 59/68 (2006.01)
C08K 5/42 (2006.01)
C08L 63/04 (2006.01)

(52) U.S. Cl.
CPC .............. C08G 59/184 (2013.01); C08K 5/42 (2013.01); C08L 63/04 (2013.01)

(58) Field of Classification Search
None
See application file for complete search history.

(56) References Cited

U.S. PATENT DOCUMENTS

2002/0072576 A1   6/2002   Schrotz et al.
2015/0337076 A1*  11/2015  Kasemi ............... C08G 59/184
                                               252/182.18
2016/0053108 A1   2/2016   Schroetz et al.
2021/0246257 A1*  8/2021   Kasemi ............... C09D 163/00

FOREIGN PATENT DOCUMENTS

EP      3255080 B1         8/2018
KR      101386027 B1       4/2014
WO      2009032099 A1      3/2009
WO      WO-2020070112 A1 * 4/2020  ........... C07C 211/27

OTHER PUBLICATIONS

"Epoxy Products for EMEA Civil Engineering Applications", provided by Olin. (Year: 2015).*

* cited by examiner

Primary Examiner — Michael J Feely
(74) Attorney, Agent, or Firm — Husch Blackwell LLP (57) ABSTRACT Provided herein is a hardener composition comprising (a) a first adduct comprising a reaction product of a liquid epoxy resin and isophorone diamine; (b) a second adduct comprising a reaction product of a liquid epoxy resin and m-xylylenediamine; and (c) an accelerator component comprising methanesulfonic acid.

13 Claims, 6 Drawing Sheets

FIG. 6

HARDENER FORMULATION FOR COLD CURING EPOXY SYSTEMS

BACKGROUND

Cold curing epoxy systems are suitable for a wide range of industrial applications, such as floorings, mortars, adhesives, coatings, lacquers and paints. Typically, cold curing epoxy systems utilize an amine hardener in combination with one or more liquid epoxy resins.

In many applications, the aesthetic appearance of the epoxy system is important. This is particularly true for epoxy systems used in self-leveling flooring applications or as top-coats over commonly used surfaces. In these applications, smooth, glossy, and undistorted surface characteristics are highly desirable.

While existing cold curing epoxy systems can provide acceptable aesthetic characteristics for use in many applications, some applications require nearly flawless surfaces that are difficult to achieve using currently available products. It is therefore desirable to provide an improved cold curing epoxy system having improved surface characteristics suitable for use in the most aesthetically demanding applications.

SUMMARY

Provided herein is a hardener composition comprising (a) a first adduct comprising a reaction product of a first epoxy resin and a first amine; (b) a second adduct comprising a reaction product of a second epoxy resin and a second amine; and (c) an accelerator component.

For example, provided herein is a hardener composition comprising (a) a first adduct comprising a reaction product of a liquid epoxy resin and isophorone diamine; (b) a second adduct comprising a reaction product of a liquid epoxy resin and m-xylylenediamine; and (c) an accelerator component comprising methanesulfonic acid.

Also provided herein is a process for preparing a hardener composition, the process comprising (a) providing a first adduct, a second adduct, and an accelerator; (b) following step (a), mixing the first adduct, the second adduct, and the accelerator to form a reaction mixture; and (c) isolating the reaction product of the reaction mixture to provide a hardener composition.

For example, provided herein is a process for preparing a hardener composition, the process comprising (a) producing a first adduct comprising a reaction product of a liquid epoxy resin and isophorone diamine; (b) producing a second adduct comprising a reaction product of a liquid epoxy resin and m-xylylenediamine; (c) mixing the first adduct, the second adduct, and methanesulfonic acid to form a reaction mixture; and (d) isolating the reaction product of the reaction mixture to provide a hardener composition.

Also provided herein is a curable composition comprising at least one epoxy resin and a hardener composition as described herein.

These and other aspects of the present disclosure are described in further detail below.

DETAILED DESCRIPTION

Provided herein is a hardener composition comprising (a) a first epoxy-amine adduct, (b) a second epoxy-amine adduct, and (c) an accelerator component. Preferably, the first epoxy-amine adduct and the second epoxy-amine adduct are each pre-manufactured, rather than being formed in situ. Surprisingly, it has been discovered that the combination of two different epoxy amine adducts combined with an accelerator, when used to cure a typical reactive diluted liquid epoxy resin, exhibits an improvement of the esthetic appearance of the cured surface, as compared to to a hardener composition comprising the same ingredients, but only forming a single epoxy amine adduct (e.g., an adduct formed in situ in a one-pot reaction).

When the hardener composition is described herein as comprising or containing certain components, it will be understood that the hardener composition comprises the reaction product of a reaction mixture containing the recited components.

(a) First Adduct

The hardener composition comprises a first adduct which is a reaction product of a first epoxy resin and a first amine. When the first adduct is described herein as containing or comprising certain components, it will be understood that the first adduct is the reaction product of a reaction mixture containing the recited components.

As used herein, the term "amine" refers to a compound having one or more primary, secondary, and/or tertiary amine functional groups. Non-limiting examples of amines that may be incorporated into the first adduct include aliphatic amines, cycloaliphatic amines, araliphatic amines, and aromatic amines. In a preferred embodiment, the first adduct comprises isophorone diamine ("IPDA").

The first adduct may comprise an epoxy resin as generally described herein. Non-limiting examples of epoxy resins that may be incorporated into the first adduct include bisphenol A diglycidyl ether ("BADGE") and bisphenol F diglycidyl ether ("BFDGE"). For example, the first adduct may comprise BADGE.

In a preferred embodiment, the first adduct comprises a reaction product of BADGE and IPDA. In an alternative embodiment, the first adduct comprises a reaction product of BFDGE and IPDA.

The hardener composition may comprise the first adduct, for example, in an amount of from about 2 weight percent to 60 weight percent based on the total weight of the hardener composition. Preferably, the hardener composition comprises the first adduct in an amount of from about 5 weight percent to about 50 weight percent, from about 10 weight percent to about 40 weight percent, from about 15 weight percent to about 45 weight percent, from about 20 weight percent to about 40 weight percent, or from about 20 weight percent to about 35 weight percent based on the total weight of the hardener composition. For example, the hardener composition may comprise the first adduct in an amount of at least about 10 weight percent, at least about 15 weight percent, at least about 20 weight percent, or at least about 25 weight percent based on the total weight of the hardener composition.

As those skilled in the art will appreciate, epoxy-amine adducts are typically prepared by reacting the epoxy resin with a molar excess of the amine. Accordingly, the first adduct may be provided in the form of a first adduct composition comprising the first adduct and a residual amount of the first amine. For example, a first adduct composition may comprise the first adduct in a concentration of about 30% to about 90% by weight and the corresponding first amine in a concentration of from about 10% by weight to about 70% by weight. As a further example, a first adduct composition may comprise the first adduct in a concentration of about 40% to about 80% by weight and the corresponding first amine in a concentration of from about 20% by weight to about 60% by weight.

(b) Second Adduct

The hardener composition further comprises a second adduct which is a reaction product of a second epoxy resin and a second amine. When the second adduct is described herein as containing or comprising certain components, it will be understood that the second adduct is the reaction product of a reaction mixture containing the recited components.

It will be understood that the amine present in the second adduct is different than the amine present in the first adduct. Non-limiting examples of amines that may be incorporated into the second adduct include aliphatic amines, cycloaliphatic amines, araliphatic amines, and aromatic amines. In a preferred embodiment, the second adduct comprises m-xylylenediamine ("MXDA").

The second adduct may comprise an epoxy resin as generally described herein. For example, the first epoxy resin and the second epoxy resin may be the same. Non-limiting examples of epoxy resins that may be incorporated into the second adduct include BADGE and BFDGE. For example, the second adduct may comprise BADGE.

In a preferred embodiment, the second adduct comprises a reaction product of BADGE and MXDA. In an alternative embodiment, the second adduct comprises a reaction product of BFDGE and MXDA.

The hardener composition may comprise the second adduct, for example, in an amount of from about 1 weight percent to 40 weight percent based on the total weight of the hardener composition. Preferably, the hardener composition comprises the second adduct in an amount of from about 2 weight percent to about 30 weight percent, from about 3 weight percent to about 8 weight percent, from about 2 weight percent to about 8 weight percent, from about 2 weight percent to about 6 weight percent, or from about 3 weight percent to about 8 weight percent based on the total weight of the hardener composition. For example, the hardener composition may comprise the second adduct in an amount of at least about 1 weight percent, at least about 2 weight percent, at least about 3 weight percent, or at least about 4 weight percent based on the total weight of the hardener composition.

As noted above, epoxy-amine adducts are typically prepared by reacting the epoxy resin with a molar excess of the amine. Accordingly, the second adduct may be provided in the form of a second adduct composition comprising the second adduct and a residual amount of the second amine. For example, a second adduct composition may comprise the second adduct in a concentration of about 30% to about 90% by weight and the corresponding second amine in a concentration of from about 10% by weight to about 70% by weight. As a further example, a second adduct composition may comprise the second adduct in a concentration of about 40% to about 80% by weight and the corresponding second amine in a concentration of from about 20% by weight to about 60% by weight.

(c) Accelerator

The hardener composition further comprises an accelerator component. The accelerator is useful for increasing the curing rate when the hardener composition is combined with an epoxy resin.

Non-limiting examples of accelerators include carboxylic acids (such as salicylic acid), alkylsulfonic acids (such as methanesulfonic acid), calcium nitrate, bisphenol A, bisphenol F, mono- and dihydric phenols (such as resorcinol and hydroquinone), and other carboxylic and/or phenolic group-containing components. Tertiary amines like benzyldimethylamine may also be used. In a preferred embodiment, the accelerator comprises methanesulfonic acid ("MSA").

The hardener composition may comprise the accelerator, for example, in an amount of from about 0.1 weight percent to 30 weight percent based on the total weight of the hardener composition. Preferably, the hardener composition comprises the accelerator in an amount of from about 1 weight percent to about 15 weight percent, from about 1 weight percent to about 10 weight percent, from about 2 weight percent to about 15 weight percent, from about 4 weight percent to about 12 weight percent, or from about 4 weight percent to about 10 weight percent based on the total weight of the hardener composition. For example, the hardener composition may comprise the accelerator in an amount of at least about 1 weight percent, at least about 2 weight percent, at least about 3 weight percent, at least about 4 weight percent, or at least about 5 weight percent based on the total weight of the hardener composition.

(d) Solvent Component

In preferred embodiments, the hardener composition may further comprise a solvent component.

Preferably, the solvent component comprises at least one high boiling point solvent. Non-limiting examples of suitable solvents include benzyl alcohol, fatty alcohols, and (alpha-methyl)styrenated phenol(s). For example, the hardener composition may comprise benzyl alcohol.

The hardener composition may comprise the solvent component, for example, in an amount of from about 5 weight percent to about 80 weight percent based on the total weight of the hardener composition. Preferably, the hardener composition comprises the solvent component in an amount of from about 10 weight percent to about 60 weight percent, from about 10 weight percent to about 50 weight percent, from about 15 weight percent to about 50 weight percent, from about 20 weight percent to about 50 weight percent, or from about 30 weight percent to about 50 weight percent based on the total weight of the hardener composition. For example, the hardener composition may comprise the solvent component in an amount of at least about 10 weight percent, at least about 20 weight percent, at least about 25 weight percent, or at least about 30 weight percent based on the total weight of the hardener composition.

(e) Further Amine Components

Optionally, the hardener composition may further comprise one or more additional amine components.

For example, the hardener composition may comprise one or more monomeric amine compounds present in the first adduct and/or the second adduct. Non-limiting examples of monomeric amines that may be incorporated into the hardener composition include aliphatic amines, cycloaliphatic amines, araliphatic amines, and aromatic amines. The hardener composition may, for example, comprise IPDA. As a further example, the hardener composition may comprise MXDA.

The hardener composition may optionally comprise one or more additional epoxy-amine adducts. For example, the hardener composition may comprise a third adduct which is a reaction product of an epoxy resin and an amine, where the amine is different from the amine present in either the first adduct or the second adduct. Non-limiting examples of amines that may be incorporated into the third adduct include aliphatic amines, cycloaliphatic amines, araliphatic amines, and aromatic amines. The third adduct may comprise an epoxy resin as defined herein; non-limiting examples of suitable epoxy resins include, for example, epoxidized monohydric alcohols. Incorporating a third adduct into the hardener composition can be useful for fine-tuning properties like the surface appearance or chemical resistance of a cured coating prepared using the hardener composition.

(f) Further Optional Components

The hardener composition may be derived from a reaction mixture that further comprises one or more optional components. Components that may be included into hardener compositions are generally known to those skilled in the art. Non-limiting examples of such optional components are viscosity modifiers, processing aides, stabilizers, and mixtures thereof.

The hardener composition may comprise one or more additional polymerization catalysts. A preferred polymerization catalyst is n-methyl morpholine ("NMM"). Other non-limiting examples of polymerization catalysts include tertiary amines, phenols, mercaptans, and imidazoles. The hardener composition may comprise the polymerization catalyst, for example, in an amount of from about 0.001% by weight to about 2% by weight, or from about 0.01% by weight to about 0.5% by weight.

Preparation of the Hardener Composition

Also provided is a method for preparing a hardener composition as described herein. In one embodiment, the method comprises (1) providing a first epoxy-amine adduct, a second epoxy-amine adduct, and an accelerator, (2) mixing the first epoxy-amine adduct, second epoxy-amine adduct, and accelerator to form a reaction mixture, and (3) isolating the reaction product of the reaction mixture to provide a hardener composition.

Generally, the epoxy-amine adducts may be pre-manufactured (i.e., prepared before being combined with any other components of the hardener composition) or prepared in situ (i.e., prepared during or after combination with one or more other components of the hardener composition). Preferably, the first epoxy-amine adduct is pre-manufactured. Preferably, the second epoxy-amine adduct is pre-manufactured. Most preferably, both the first epoxy-amine adduct and the second epoxy-amine adduct are pre-manufactured.

Preferably, the method of preparing the hardener composition comprises mixing the components at room temperature. Alternatively, the method of preparing the hardener composition may comprise mixing the components at an elevated temperature (e.g., from about 30° C. to about 60° C.). If necessary to dissolve one or more solid or high viscous ingredients, the temperature of the reaction mixture may be raised to a range of from about 80° C. to about 120° C. to ensure complete dissolution of all the components.

Curable Compositions

Also provided herein is a curable composition comprising (I) at least one epoxy resin and (II) a hardener composition as described above. The curable composition may additionally comprise one or more optional additives, as described in further detail below.

Epoxy Resin

The curable composition comprises an epoxy resin component (I) comprising at least one epoxy resin as defined herein. The epoxy resin component may comprise a single epoxy resin compound or a mixture of two or more epoxy compounds used in combination.

The epoxy resin is preferably a liquid epoxy resin. In some embodiments, the epoxy resin may be a semi-solid.

Non-limiting examples of epoxy resins that may be preferred for use in the curable composition include aliphatic epoxy resins, cycloaliphatic epoxy resins, bisphenol A epoxy resins, bisphenol F epoxy resins, phenol novolac epoxy resins, cresol-novolac epoxy resins, biphenyl epoxy resins, polyfunctional epoxy resins, naphthalene epoxy resins, divinylbenzene dioxide, 2-glycidylphenylglycidyl ether, dicyclopentadiene-type epoxy resins, phosphorous containing epoxy resin, multi aromatic resin type epoxy resins, and mixture thereof. Other non-limiting examples of epoxy resins that may be preferred for use in the curable composition include trimethylpropane epoxide, cyclohexanedimethanol diglycidyl ether, diglycidyl-1,2-cyclohexane dicarboxylate, diglycidyl ether of bisphenol A, diglycidyl ether of bisphenol F, resorcinol diglycidyl ether, triglycidyl ethers of para-aminophenols, halogen (for example, chlorine or bromine)-containing epoxy resins such as diglycidyl ether of tetrabromobisphenol A, epoxidized phenol novolac, epoxidized bisphenol A novolac, oxazolidone-modified epoxy resins, epoxy-terminated polyoxazolidones, and mixtures thereof.

Particularly preferred examples of epoxy resins that may be incorporated into the curable composition include bisphenol A diglycidyl ether (BADGE) and bisphenol F diglycidyl ether (BFDGE). For example, the curable composition may comprise BADGE.

Hardener Composition

The curable composition further comprises a hardener composition (II), which may be selected as described in detail above.

In general, an equivalent ratio of the epoxy resin component (I) to the hardener composition (II) is sufficient to form a coating or a thermoset. The equivalent ratio of the epoxy resin to the hardener composition is preferably such that the epoxy/hardener is in a ratio of about 1 epoxy-equivalent to 1 amine-hydrogen-equivalent ("AHEW"). Preferably, the epoxy-equivalent to amine-hydrogen-equivalent ratio is from about 1:0.5 to about 1:1.5, more preferably from about 1:0.8 to about 1:1.2, and even more preferably from about 1:0.9 to about 1:1.1. The use of any concentration outside the above ranges is less preferred, as it may weaken the network formed.

Optional Additives

The coating composition may further comprise one or more optional additives commonly used to prepare thermoset or coating compositions. Non-limiting examples of optional compounds or additives include dispersant additives, deformer additives, flowing additives, catalysts, solvents, fillers, pigments, toughening agents, flexibilizing agents, processing aides, flow modifiers, adhesion promoters, diluents, stabilizers, plasticizers, catalyst de-activators, flame retardants, aromatic hydrocarbon resins, coal tar pitch, petroleum pitch, carbon nanotubes, graphene, carbon black, carbon fibers, or mixtures thereof.

For example, the curable composition may optionally comprise one or more reactive diluents. Non-limiting examples of reactive diluents include cresyl glycidyl ether (CGE), para tertiary butyl phenyl glycidyl ether (ptBPGE), $C_{12}/C_{14}$ glycidyl ether, butanediol diglycidyl ether (BDDGE), hexanediol-diglycidyl ether (HDDGE), branched glycidyl ethers such as $C_{13/15}$ or $C_{12/14}$, alcohol glycidyl ether, and glycidyl esters such as versatic acid glycidyl esters.

Preferably, the curable composition comprises the optional compounds or additives in an amount of from about 0 weight percent to about 5 weight percent based on the total weight of the curable composition. For example, the amount of the optional compounds or additives may range from about 0 weight percent to about 5 weight percent, from about 0.1 weight percent to about 2.5 weight percent, or from about 0.1 weight percent to about 1 weight percent based on the total weight of the curable composition.

Products Prepared from the Curable Composition

Products that may be prepared from a curable composition as described herein are generally known to those skilled in the art. Non-limiting examples of such products include a primer, a self-leveling flooring, a coating, a lacquer, a paint, and an adhesive.

Other objects and features will be in part apparent and in part pointed out hereinafter.

Definitions

Epoxy Resin

As used herein, the term "epoxy resin" means a composition which possesses one or more vicinal epoxy groups per molecule, i.e. at least one 1,2-epoxy group per molecule. In general, the epoxy resin compound may be a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

The epoxy resins useful in the present invention may include monoepoxides, diepoxides, polyepoxides or mixtures thereof. Illustrative compounds useful in the practice of the instant invention are described in the *Handbook of Epoxy Resins* by N. E. Lee and K. Neville published in 1967 by McGraw-Hill, New York: and U.S. Pat. No. 4,066,628, both of which are incorporated herein by reference.

The compound having at least one vicinal epoxy group may comprise a compound having two vicinal epoxy groups. For example, particularly useful compounds which can be used in the practice of the present invention are epoxy resins having the following formula:

wherein n has an average value of generally 0 or more, preferably from 0 to about 100, and more preferably from about 0.1 to about 50.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxyphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A; and any combination thereof.

Examples of diepoxides particularly useful in the present invention include diglycidyl ether of bisphenol A, diglycidyl ether of bisphenol F, and diglycidyl ether of 2,2-bis(3,5-dibromo-4-hydroxyphenyl) propane (generally referred to as tetrabromobisphenol A). Mixtures of any two or more diepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference; or the diglycidyl esters of dicarboxylic acids such as those described in U.S. Pat. No. 5,171,820, incorporated herein by reference. Other suitable diepoxides include for example, αω-diglycidyloxyisopropylidene-bisphenol-based epoxy resins such as those commercially known as D.E.R.® 300 and 600 series epoxy resins, which are available products from Olin Corporation.

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Preferred epoxy resins useful in the present invention include, for example, the diglycidyl ethers of bisphenol A; 4,4'-sulfonyldiphenol; 4,4-oxydiphenol; 4,4'-dihydroxybenzophenone; resorcinol; hydroquinone; 9,9'-bis(4-hydroxyphenyl)fluorene; 4,4'-dihydroxybiphenyl or 4,4'-dihydroxy-α-methylstilbene and the diglycidyl esters of the dicarboxylic acids mentioned previously.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cyclohexane carboxylate, bis-(3,4-epoxycyclohexyl) adipate, vinylcyclohexene monoxide and mixtures thereof.

Suitable commercially available epoxy resin compounds include D.E.R.™ 300 series, the D.E.N.™ 400 series, the D.E.R.™ 500 series, the D.E.R.™ 600 series and the D.E.R.™ 700 series of epoxy resins commercially available from Olin Corporation. Other non-limiting examples of epoxy resins may include liquid epoxy resins (LERs), such as D.E.R. 331 (a bispheriol A diglycidyl ether, BADGE), D.E.R. 354 (a bisphenol F diglycidyl ether), D.E.R. 324 (a diluent modified epoxy resin), other low viscosity epoxy resin blends, and other well-known epoxy resins and blends or mixtures of the above known epoxy resins. D.E.R. 324, D.E.R. 330, D.E.R. 331, D.E.R. 332, and D.E.R. 354 are commercially available epoxy resins from Olin Corporation. Other commercially available epoxy resin compounds may include for example BADGE with a molecular weight less than 700. As a non-limiting example, the curable composition may comprise a liquid epoxy resin. An exemplary liquid epoxy resin is D.E.R. 331, a diglycidylether of bisphenol A (DGEBPA) having an epoxide equivalent weight of from about 170 to about 190, a viscosity of about 10 Pa's at 25° C., and a density of about 1.2 g/cc.

EXAMPLES

The following non-limiting examples are provided to further illustrate the present disclosure.

Example 1: Sample Preparation

Hardener compositions were prepared using the methods described below, and were tested for various properties as set forth in the following examples.

D.E.R. 331 is a liquid epoxy resin commercially available from Olin Corporation.

Adduct Composition 1 comprises about 60% by weight of an IPDA-BADGE adduct and about 40% by weight of unreacted IPDA.

Adduct Composition 2 comprises about 60% by weight of an MXDA-BADGE adduct and about 40% by weight of unreacted MXDA.

IPDA is isophorone diamine.

MXDA is m-xylylenediamine.

MSA is methanesulfonic acid.

An inventive hardener composition was prepared by mixing the components listed in Table 1 at room temperature.

TABLE 1

| Inventive Example 1 | |
|---|---|
| Components | Inventive Example 1 |
| Benzyl alcohol | 39.8 g |
| IPDA | 15.5 g |
| MSA | 3.5 g |
| MXDA | 6.9 g |
| Adduct Composition 1 | 30 g |
| Adduct Composition 2 | 4.3 g |
| Total | 100 g |

A comparative hardener composition was prepared by mixing the components listed in Table 2 below as follows. The benzyl alcohol and IPDA were combined and then heated to 90° C., followed by addition of the D.E.R. 331 under stirring. Heat was maintained at 90° C. for 40 minutes, followed by cooling to room temperature. The MXDA was then added, followed by the MSA.

TABLE 2

| Comparative Example 2 | |
|---|---|
| Components | Comparative Example 2 |
| Benzyl alcohol | 39.8 g |
| IPDA | 36.5 g |
| MSA | 3.5 g |
| MXDA | 9.5 g |
| D.E.R. 331 | 10.7 g |
| Total | 100 g |

D.E.H. 488 is a commercially available hardener from Olin Corporation. D.E.H. 488 is based upon an IPDA-epoxy adduct produced in situ, and is used as Comparative Example 3 in the following examples.

Example 2: Physical Data (QC) Characterization

Physical data collected for the Inventive and Comparative Examples are presented in the tables below.

TABLE 3

| Amine Number (ISO 9702) | |
|---|---|
| Composition | Amine Number (mg KOH/g) |
| Inventive Example 1 | 296 |
| Comparative Example 2 | 297 |
| Comparative Example 3 | 300-330 |

TABLE 4

Refraction Index @ 25° C.,
$n_D^{25}$ (DIN EN ISO 10342)

| Composition | Refraction Index |
| --- | --- |
| Inventive Example 1 | 1.5350 |
| Comparative Example 2 | 1.5352 |

TABLE 5

Gardner Color Index -
10 mm vial (ASTM D 1544)

| Composition | Gardner Color Index |
| --- | --- |
| Inventive Example 1 | 0.6 |
| Comparative Example 2 | 0.7 |
| Comparative Example 3 | <2.0 |

TABLE 6

Kinematic Viscosity @ 25° C. (ASTM D 445)

| Composition | Kinematic Viscosity (mPa · s) |
| --- | --- |
| Inventive Example 1 | 278 |
| Comparative Example 2 | 283 |
| Comparative Example 3 | 280-380 |

Example 3: Reactivity (Pot Life) Measurement (TECAM Geltimer)

Pot life was measured on 100 g batches of the corresponding hardener in combination with D.E.R. 3531 (a liquid epoxy resin commercially available from Olin Corporation). The hardener and epoxy resin were mixed in a 2:1 ratio of epoxy resin to hardener on a weight/weight basis.

TABLE 7

100 Gram Pot Life with D.E.R. 3531

| Composition | Pot Life (minutes) |
| --- | --- |
| Inventive Example 1 | 26 |
| Comparative Example 2 | 25 |
| Comparative Example 3 | 28 |

Example 4: Hardness Development (Shore D, Unitless, DIN 53505)

Hardness development was measured on 2 mm films cast from the corresponding hardener in combination with D.E.R. 3531 (a liquid epoxy resin commercially available from Olin Corporation). The hardener and epoxy resin were mixed in a 2:1 ratio of epoxy resin to hardener on a weight/weight basis, which equals 1 EEW with 1 AHEW.

TABLE 8A

Hardness Development of Inventive
Example 1 + D.E.R. 3531

| Time (hours) | Shore D (@ 23° C.) | Shore D (@ 13° C.) |
| --- | --- | --- |
| 16 | 55 | 23 |
| 18 | 57 | 30 |
| 24 | 64 | 44 |
| 48 | 71 | 66 |
| 7 days | 75 | 73 |

TABLE 8B

Hardness Development of Comparative
Example 2 + D.E.R. 3531

| Time (hours) | Shore D (@ 23° C.) | Shore D (@ 13° C.) |
| --- | --- | --- |
| 16 | 57 | 26 |
| 18 | 61 | 30 |
| 24 | 67 | 44 |
| 48 | 75 | 67 |
| 7 days | 78 | 76 |

TABLE 8C

Hardness Development of Comparative
Example 3 + D.E.R. 3531

| Time (hours) | Shore D (@ 23° C.) | Shore D (@ 13° C.) |
| --- | --- | --- |
| 16 | 51 | 16 |
| 18 | 55 | 24 |
| 24 | 63 | 40 |
| 48 | 74 | 67 |
| 7 days | 76 | 75 |

Example 5: Surface Appearance and Early Water Spot Resistance (Visual Method)

Surface appearance and early water spot resistance was measured on 2 mm films cast from the corresponding hardener in combination with D.E.R. 3531 (a liquid epoxy resin commercially available from Olin Corporation). The hardener and epoxy resin were mixed in a 2:1 ratio of epoxy resin to hardener on a weight/weight basis. To measure the early water spot resistance, a droplet of water was placed directly onto the surface.

Surprisingly, it was found that at room temperature, Inventive Example 1 exhibits a much better appearance in terms of gloss and haziness by visual inspection in comparison to Comparative Examples 2 and 3.

TABLE 9

Surface appearance (visual on gloss and haziness, left)/
early water spot resistance (amine blush, whitening, right)

| Climate | Inventive Example 1 | Comparative Example 2 | Comparative Example 3 |
|---|---|---|---|
| 23° C./50% rH | ++*/++ | (++)/++ | (++)/++ |
| 13° C./80% rH | +/+ | +/0 | +/(++) |

++: very good
+: good
0: fair
−: unsatisfactory
−−: insufficient
*: tendency to next higher value
( ): tendency to next lower value Example 6: Chemical Resistance ("Cotton-Pad Testing")

Chemical resistance was measured on 5 mm films cast from the corresponding hardener in combination with D.E.R. 3531 (a liquid epoxy resin commercially available from Olin Corporation). The hardener and epoxy resin were mixed in a 2:1 ratio of epoxy resin to hardener on a weight/weight basis.

A cotton pad soaked with the corresponding test formulation was place onto the surface and covered with a lid. The cotton pad was not allowed to dry out by re-wetting during the test time of 7 days. Shore D values were determined after 1, 3 and 7 days. The loss of Shore D was calculated according to the following equation: $100-((ShoreD_{initial}-ShoreD_{actual})/ShoreD_{initial}*100)$.

Figure 1:
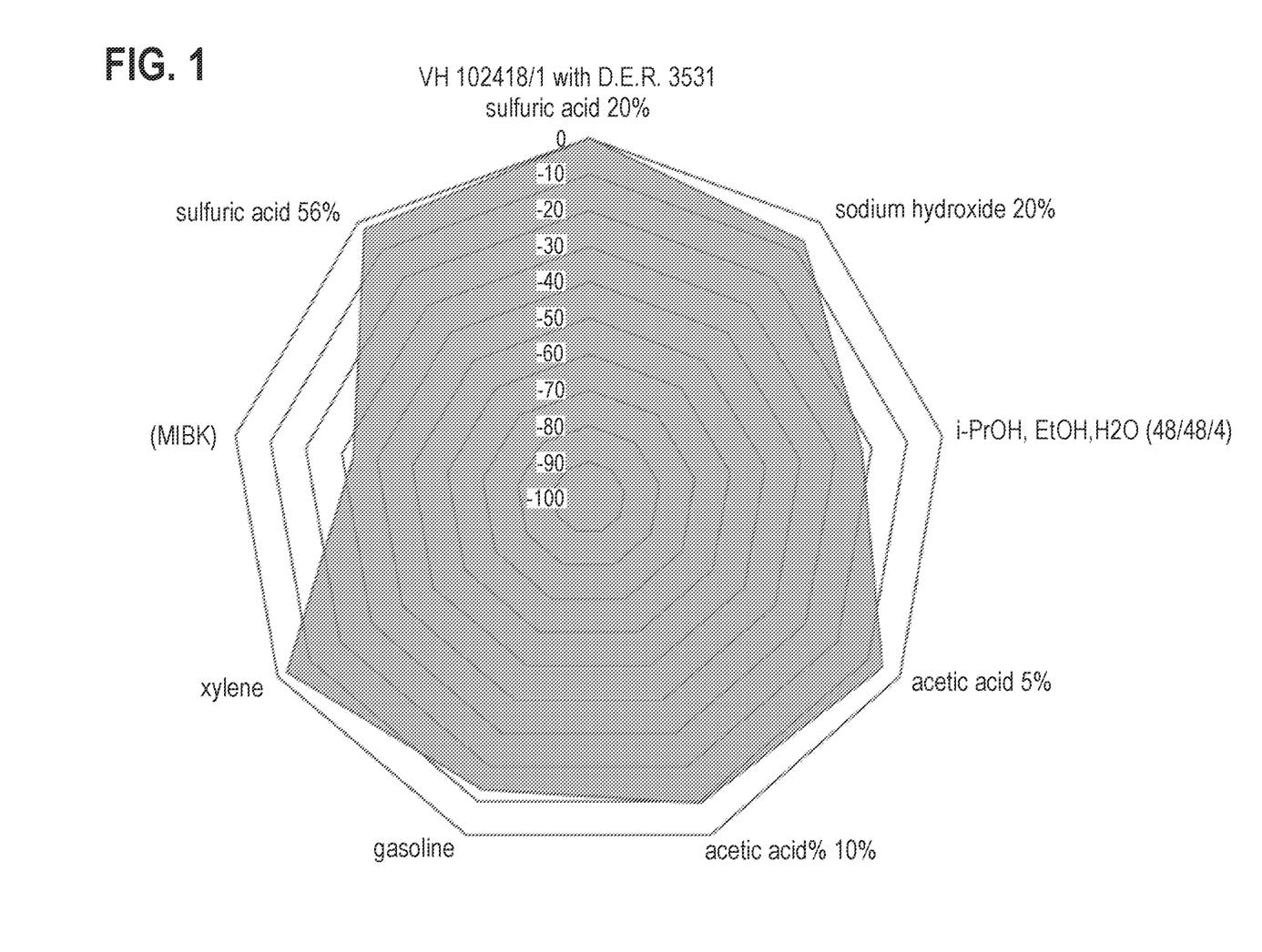
FIG. 1 is an illustration of the data presented in Table 10A of Example 6, and depicts the chemical resistance of a 5 mm films cast from the hardener of Inventive Example 1 in combination with D.E.R. 3531 (a liquid epoxy resin commercially available from Olin Corporation).
Figure 2:
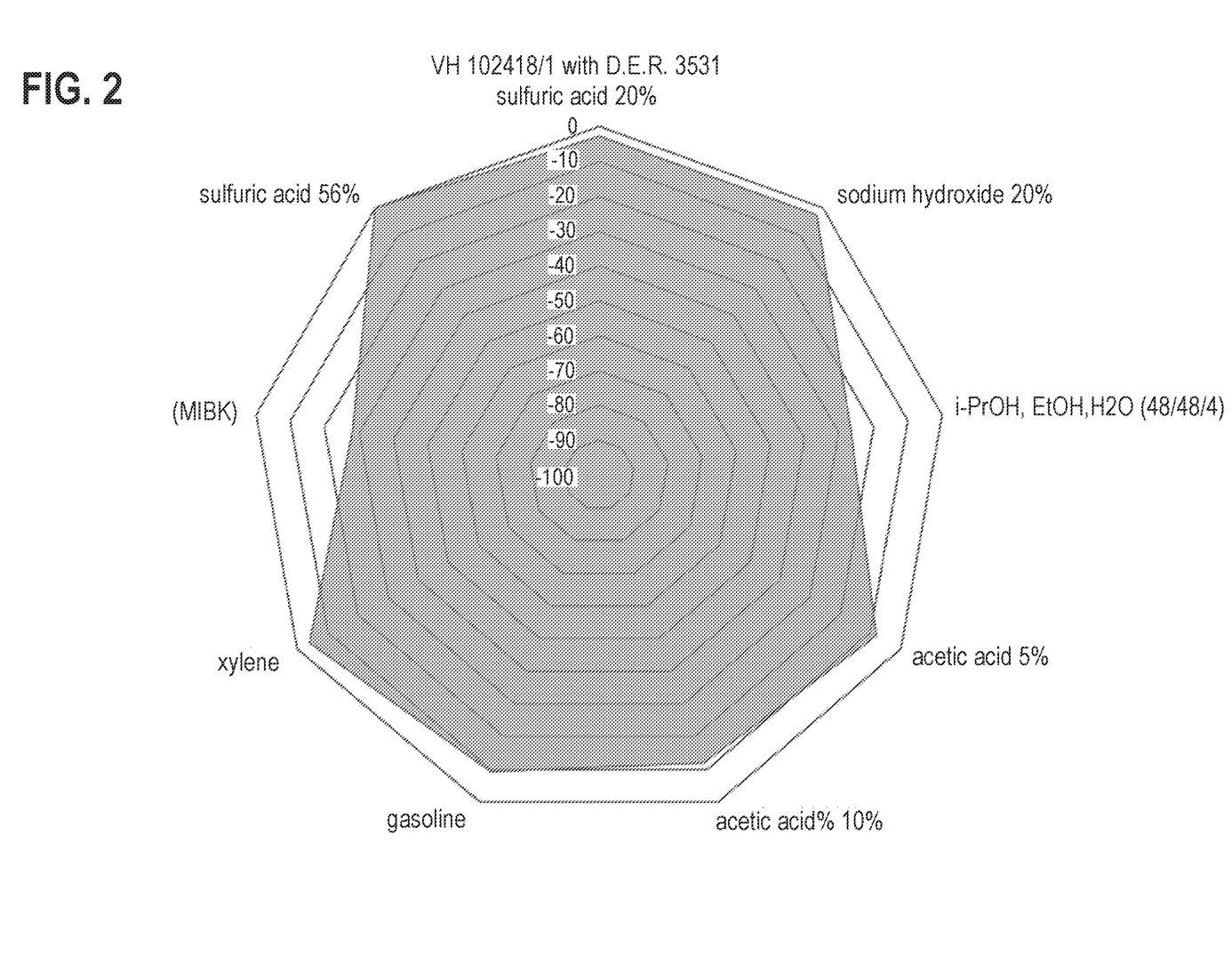
FIG. 2 is an illustration of the data presented in Table 10B of Example 6, and depicts the chemical resistance of a 5 mm film cast from the hardener of Inventive Example 2 in combination with D.E.R. 3531.
Figure 3:
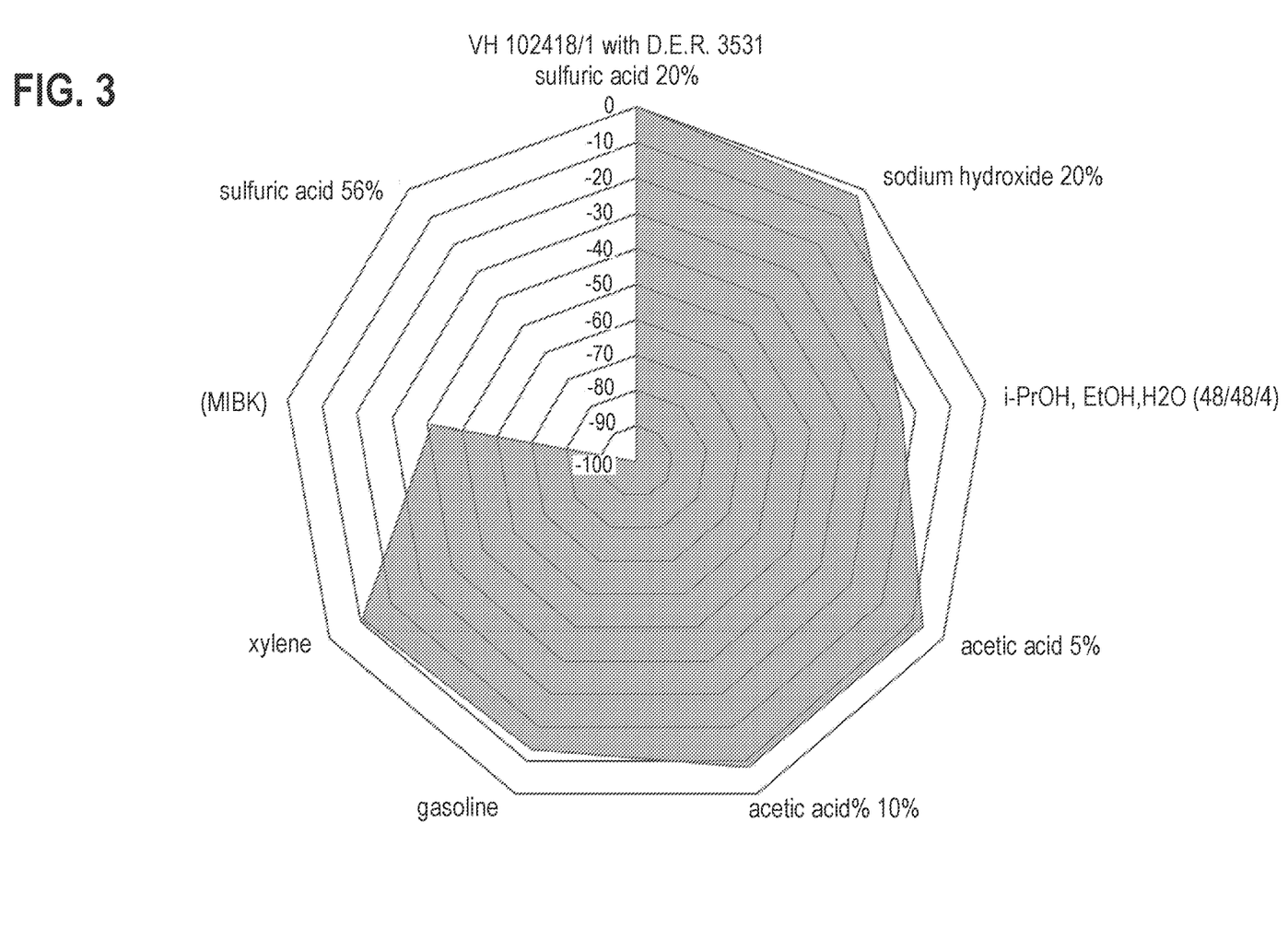
FIG. 3 is an illustration of the data presented in Table 10C of Example 6, and depicts the chemical resistance of a 5 mm film cast from the hardener of Inventive Example 3 in combination with D.E.R. 3531.

The data presented for Inventive Example 1 in Table 10A below are graphically represented in FIG. 1. Likewise, the data presented for Comparative Example 2 in Table 10B below are graphically represented in FIG. 2, and the data presented for Comparative Example 3 in Table 10C below are graphically represented in FIG. 3.

TABLE 10A

Chemical Resistance of 5 mm film
starting @ ShoreD 75 (Inventive Example 1)

| Chemicals | 24 h | 48 h | 168 h (7 days) |
|---|---|---|---|
| $H_2SO_4$ 56% | 72 | 73 | 73 |
| NaOH 20% | 68 | 68 | 70 |
| HOAc 5% | 72 | 72 | 71 |
| HOAc 10% | 71 | 70 | 68 |
| i-PrOH/EtOH/$H_2O$ (48/48/4 by vol) | 69 | 64 | 58 |
| Gasoline | 69 | 68 | 65 |
| Xylene | 75 | 75 | 73 |
| MIBK | 69 | 64 | 50 (slightly arched) |
| $H_4SO_4$ 20% | 75 | 75 | 75 |

TABLE 10B

Chemical Resistance of 5 mm film starting @
ShoreD 75 (Comparative Example 2)

| Chemicals | 24 h | 48 h | 168 h (7 days) |
|---|---|---|---|
| $H_2SO_4$ 56% | 75 | 75 | 75 |
| NaOH 20% | 73 | 73 | 73 |
| HOAc 5% | 70 | 69 | 69 |
| HOAc 10% | 70 | 69 | 66 |
| i-PrOH/EtOH/$H_2O$ (48/48/4 by vol) | 65 | 61 | 55 (slightly arched) |
| Gasoline | 72 | 71 | 68 |
| Xylene | 73 | 72 | 72 |
| MIBK | 72 | 68 | 54 (slightly arched) |
| $H_2SO_4$ 20% | 72 | 72 | 73 |

TABLE 10C

Chemical Resistance of 5 mm film starting @
ShoreD 75 (Comparative Example 3)

| Chemicals | 24 h | 48 h | 168 h (7 days) |
|---|---|---|---|
| NaOH 20% | 73 | 72 | 73 |
| HOAc 5% | 74 | 73 | 70 |
| HOAc 10% | 72 | 70 | 69 |
| i-PrOH/EtOH/$H_2O$ (48/48/4 by vol) | 68 | 65 | 57 |
| Gasoline | 70 | 69 | 65 |
| Xylene | 72 | 71 | 67 |
| MIBK | 66 | 59 | 44 (slightly arched) |
| $H_2SO_4$ 20% | 75 | 75 | 75 |

Example 7: Mechanical Values (ASTM E 1356, ISO 604, ISO 527-2, ISO 178)

Mechanical values were measured on specimen cast from the corresponding hardener in combination with D.E.R. 3531 (a liquid epoxy resin commercially available from Olin Corporation). The hardener and epoxy resin were mixed in a 2:1 ratio of epoxy resin to hardener on a weight/weight basis.

TABLE 11

Glass transition temperature via DSC

| Composition | Tg pot (° C.) |
|---|---|
| Inventive Example 1 | 53.9 |
| Comparative Example 2 | 52.2 |
| Comparative Example 3 | 64.7 |

TABLE 12

Compression Testing

| Composition | $F_{max}$ (MPa) | Compression (%) |
|---|---|---|
| Inventive Example 1 | 61.63 | 4.096 |
| Comparative Example 2 | 64.12 | 4.987 |
| Comparative Example 3 | 64.65 | 3.199 |

TABLE 13

Tensile Testing

| Composition | Modulus of elasticity E-Modul (MPa) | Tensile strength (MPa) | Strain at break εM(%) | Strain at break εB (%) |
|---|---|---|---|---|
| Inventive Example 1 | 2057.2 | 33.025 | 2.112 | 2.112 |
| Comparative Example 2 | 2238.7 | 33.194 | 1.843 | 1.843 |
| Comparative Example 3 | 1992.2 | 36.924 | 2.747 | 2.837 |

TABLE 14

Bending Testing

| Composition | Modulus of elasticity E-Modul (b) (MPa) | Bending strength (MPa) |
|---|---|---|
| Inventive Example 1 | 1856 | 53.332 |
| Comparative Example 2 | 1762 | 52.814 |
| Comparative Example 3 | 2156 | 67.142 |

Example 8: Discoloration Resistance

Discoloration resistance (yellowing) was measured on 2 mm films cast from the corresponding hardener in combination with D.E.R. 3531 (a liquid epoxy resin commercially available from Olin Corporation). The hardener and epoxy resin were mixed in a 2:1 ratio of epoxy resin to hardener on a weight/weight basis.

Specimens were irradiated by a 5 W UV-B lamp for given period. Lamp was placed directly onto the specimen. As no control of Energy/Area (W/mm$^2$) is possible with this setup, small specimens (test and control) were arranged side-by-side and irradiated simultaneously.

Figure 4:
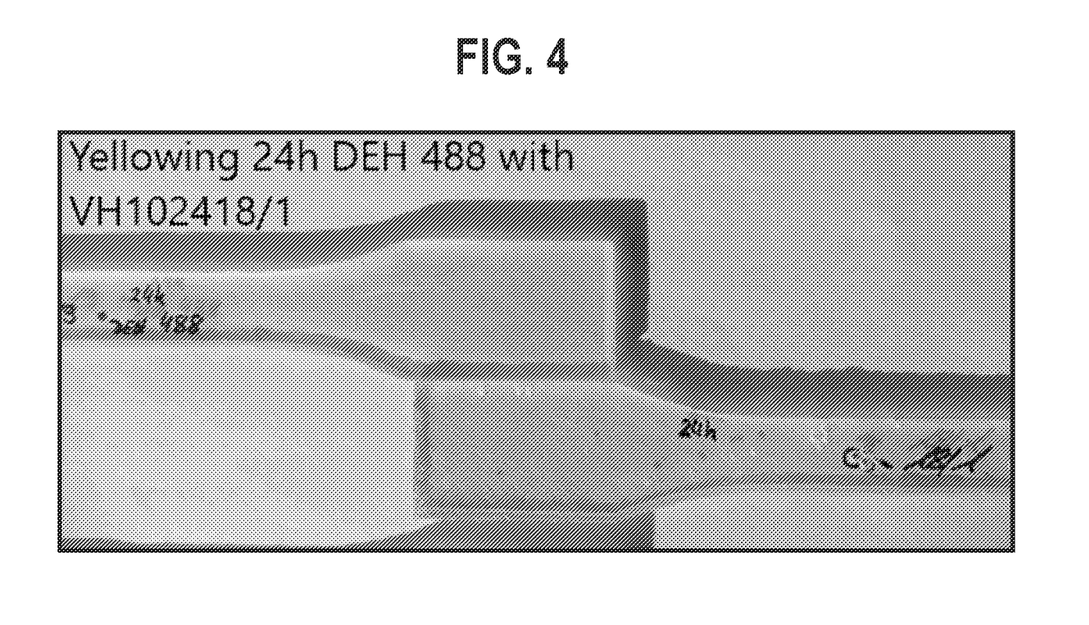
FIG. 4 is a photograph of specimens produced with Inventive Example 1 (lower specimen) and Comparative Example 3 (upper specimen) after 24 hours of UV irradiation as described in Example 8.

FIG. 4 is a photograph of specimens produced with Inventive Example 1 (lower specimen) and Comparative Example 3 (upper specimen) after 24 hours of UV irradiation.

Figure 5:
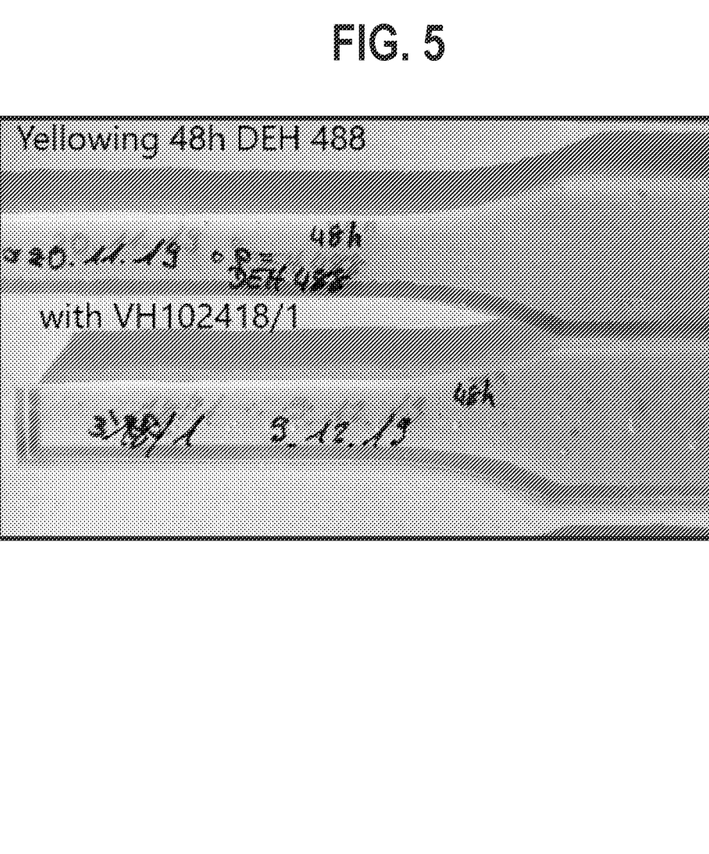
FIG. 5 is a photograph of specimens produced with Inventive Example 1 (lower specimen) and Comparative Example 3 (upper specimen) after 24 hours of UV irradiation as described in Example 8.

FIG. 5 is a photograph of specimens produced with Inventive Example 1 (lower specimen) and Comparative Example 3 (upper specimen) after 24 hours of UV irradiation.

Figure 6:
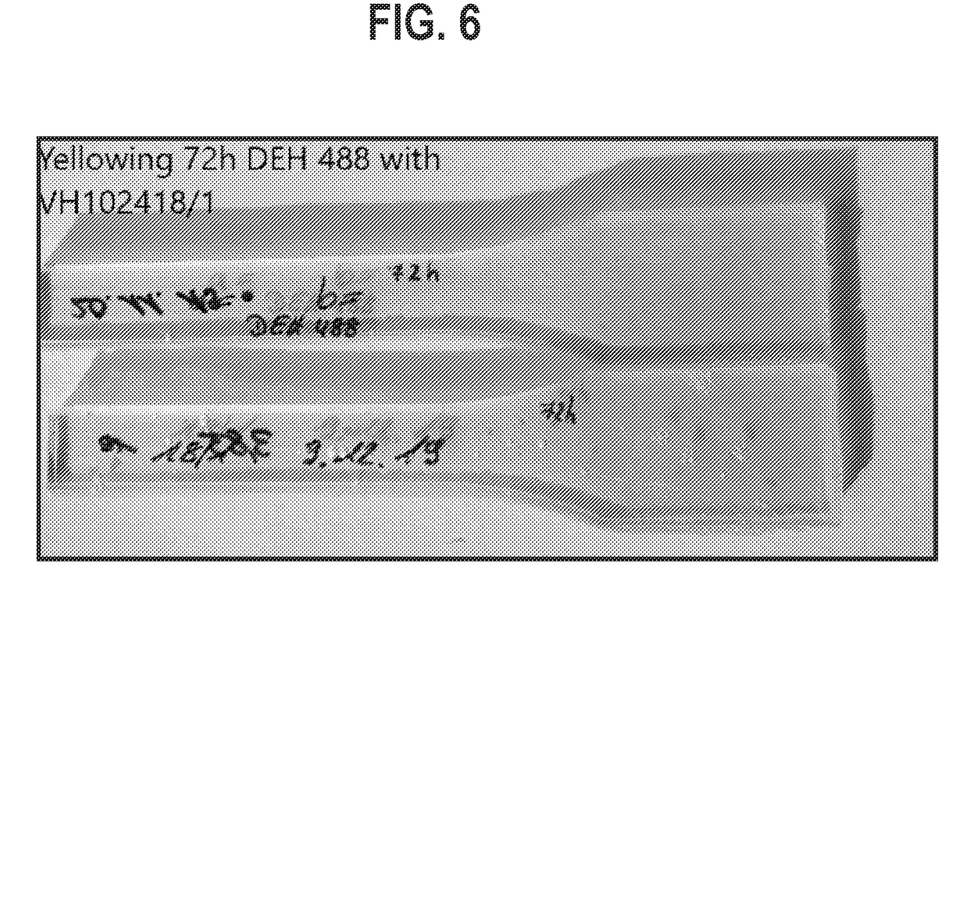
FIG. 6 is a photograph of specimens produced with Inventive Example 1 (lower specimen) and Comparative Example 3 (upper specimen) after 24 hours of UV irradiation as described in Example 8.

FIG. 6 is a photograph of specimens produced with Inventive Example 1 (lower specimen) and Comparative Example 3 (upper specimen) after 24 hours of UV irradiation.

When introducing elements of the present disclosure or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several objects of the disclosure are achieved and other advantageous results attained.

As various changes could be made in the above products and methods without departing from the scope of the disclosure, it is intended that all matter contained in the above description shall be interpreted as illustrative and not in a limiting sense.

What is claimed is:

1. A curable composition comprising:
   (a) at least one liquid epoxy resin selected from the group consisting of bisphenol A diglycidyl ether, bisphenol F diglycidyl ether, a novolac epoxy resin, and mixtures thereof; and
   (b) a hardener composition comprising:
      (1) from about 5 weight percent to about 50 weight percent, based on the total weight of the hardener composition, of a first epoxy-amine adduct,
      (2) from about 2 weight percent to about 30 weight percent, based on the total weight of the hardener composition, of a second epoxy-amine adduct, and
      (3) from about 1 weight percent to about 15 weight percent, based on the total weight of the hardener composition, of an accelerator component comprising methanesulfonic acid;
   wherein the first epoxy-amine adduct is provided as an epoxy-amine adduct composition comprising about 30% to about 90% by weight of an adduct of bisphenol A diglycidyl ether and isophorone diamine and about a weight balance of unreacted isophorone diamine;
   wherein the second epoxy-amine adduct is provided as an epoxy-amine adduct composition comprising about 30% to about 90% by weight of an adduct of bisphenol A diglycidyl ether and m-xylylenediamine and about a weight balance of unreacted m-xylylenediamine; and
   wherein a ratio of the epoxy-equivalent in (a) to the amine-hydrogen equivalent in (b) is from about 1:0.5 to about 1:1.5.

2. The curable composition of claim 1, wherein the hardener composition comprises from about 10 weight percent to about 40 weight percent, based on the total weight of the hardener composition, of the first epoxy-amine adduct.

3. The curable composition of claim 1, wherein the hardener composition comprises from about 3 weight percent to about 8 weight percent, based on the total weight of the hardener composition, of the second epoxy-amine adduct.

4. The curable composition of claim 1, wherein the hardener composition comprises from about 1 weight percent to about 10 weight percent, based on the total weight of the hardener composition, of the accelerator component comprising methanesulfonic acid.

5. The curable composition of claim 1, wherein the hardener composition further comprises a solvent component comprising at least one high boiling point solvent selected from the group consisting of benzyl alcohol, fatty alcohols, and (alpha-methyl) styrenated phenol(s).

6. The curable composition of claim 5, wherein the solvent component comprises benzyl alcohol or (alpha-methyl) styrenated phenol(s).

7. The curable composition of claim 5, wherein the hardener composition comprises from about 10 weight percent to about 60 weight percent, based on the total weight of the hardener composition, of the solvent component.

8. The curable composition of claim 1, wherein the hardener component further comprises one or more additional amine components.

9. The curable composition of claim 8, wherein the one or more additional amine components comprises one or more monomeric amines selected from the group consisting of aliphatic amines, cycloaliphatic amines, araliphatic amines, and aromatic amines.

10. The curable composition of claim 1, wherein the ratio of the epoxy-equivalent in (a) to the amine-hydrogen equivalent in (b) is from about 1:0.8 to about 1:1.2.

11. The curable composition of claim 1, wherein the at least one liquid epoxy resin is selected from the group consisting of bisphenol A diglycidyl ether, bisphenol F diglycidyl ether, and mixtures thereof.

12. The curable composition of claim 1, wherein the at least one liquid epoxy resin comprises a novolac epoxy resin.

13. A product prepared from the curable composition of claim 1, the product selected from the group consisting of a primer, a self-leveling flooring, a coating, a lacquer, a paint, and an adhesive.

* * * * *